(12) United States Patent
Li et al.

(10) Patent No.: US 12,543,175 B2
(45) Date of Patent: Feb. 3, 2026

(54) RESOURCE TRANSMISSION METHOD, RESOURCE TRANSMISSION APPARATUS, AND COMMUNICATIONS DEVICE

(71) Applicant: VIVO MOBILE COMMUNICATION CO., LTD., Guangdong (CN)

(72) Inventors: Na Li, Guangdong (CN); Gen Li, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 447 days.

(21) Appl. No.: 18/108,049

(22) Filed: Feb. 10, 2023

(65) Prior Publication Data

US 2023/0189259 A1 Jun. 15, 2023

Related U.S. Application Data

(63) Continuation of application No. PCT/CN2021/111499, filed on Aug. 9, 2021.

(30) Foreign Application Priority Data

Aug. 12, 2020 (CN) .......................... 202010809437.5

(51) Int. Cl.
*H04W 72/23* (2023.01)
*H04W 72/0453* (2023.01)
(Continued)

(52) U.S. Cl.
CPC ... *H04W 72/1268* (2013.01); *H04W 72/0453* (2013.01)

(58) Field of Classification Search
CPC . H04W 16/14; H04W 72/23; H04W 72/0446; H04W 48/12; H04W 72/21;
(Continued)

(56) References Cited

U.S. PATENT DOCUMENTS

2018/0020452 A1* 1/2018 Yerramalli ........ H04W 72/0453
2018/0310341 A1* 10/2018 Yerramalli ........ H04W 74/0833
(Continued)

FOREIGN PATENT DOCUMENTS

CN 106550468 A 3/2017
CN 109428626 A 3/2019
(Continued)

OTHER PUBLICATIONS

Second Japanese Office Action for Japanese Patent Application No. 2023-509553 dated Sep. 20, 2024. 6 pages.
(Continued)

*Primary Examiner* — Sai Aung
(74) *Attorney, Agent, or Firm* — Perilla Knox & Hildebrandt LLP; Kenneth A. Knox

(57) ABSTRACT

A resource transmission method, a resource transmission apparatus, and a communications device. The resource transmission method is applied to a terminal and includes: obtaining first information, where the first information includes at least one of configuration information and scheduling information for uplink transmission; and determining an uplink transmission mode based on the first information, where the uplink transmission mode supports frequency hopping on an unlicensed frequency band, or the uplink transmission mode does not support frequency hopping on the unlicensed frequency band.

20 Claims, 9 Drawing Sheets

(51) Int. Cl.
*H04W 72/1268* (2023.01)
*H04W 72/21* (2023.01)

(58) Field of Classification Search
CPC ............ H04W 72/1268; H04W 24/10; H04W 56/0015; H04W 74/006; H04W 52/0229; H04W 72/01
See application file for complete search history.

(56) References Cited

U.S. PATENT DOCUMENTS

| | | | |
|---|---|---|---|
| 2018/0323932 A1 | 11/2018 | Huang et al. | |
| 2019/0007946 A1* | 1/2019 | Yerramalli | H04B 1/713 |
| 2019/0020424 A1* | 1/2019 | Yerramalli | H04B 17/309 |
| 2020/0137788 A1 | 4/2020 | Chang et al. | |
| 2020/0204327 A1 | 6/2020 | Jia et al. | |
| 2020/0336973 A1* | 10/2020 | Niu | H04W 72/23 |
| 2020/0374057 A1 | 11/2020 | Matsumura et al. | |
| 2020/0374896 A1 | 11/2020 | Bae et al. | |
| 2020/0412406 A1 | 12/2020 | Moroga et al. | |
| 2021/0235496 A1* | 7/2021 | Park | H04B 1/715 |
| 2021/0289547 A1* | 9/2021 | Ye | H04B 1/7156 |
| 2022/0022208 A1 | 1/2022 | Nakamura et al. | |
| 2022/0060215 A1 | 2/2022 | Nakamura et al. | |

FOREIGN PATENT DOCUMENTS

| | | |
|---|---|---|
| CN | 111246582 A | 6/2020 |
| EP | 3648386 A1 | 11/2019 |
| JP | 2018526890 A | 9/2018 |
| JP | 2020108103 A | 7/2020 |
| JP | 2020108104 A | 7/2020 |
| WO | 2018064525 A1 | 4/2018 |
| WO | 2019097655 A1 | 5/2019 |
| WO | 2019160359 A1 | 8/2019 |
| WO | 2019167939 A1 | 9/2019 |
| WO | 2020036464 A1 | 2/2020 |
| WO | 2020051152 A1 | 3/2020 |
| WO | 2020143689 A1 | 7/2020 |

OTHER PUBLICATIONS

First Office Action for Chinese Application No. 202010809437.5, dated May 25, 2023, 6 Pages.
3GPPRAN1-AH-1801(signed).
MCC Support "Draft Report of 3GPP TSG RAN WG1 #AH_1801 v0.1.0" 3GPP TSG RAN WG1 Meeting #92, Athens, Greece, Mar. 2018, R1-180xxxx, 114 Pages.
TDoc_List_Meeting_RAN1-AH-1801(180201).
International Search Report and Written Opinion for Application No. PCT /CN2021/111499, dated Nov. 15, 2021, 7 Pages.
Extended European Search Report for Application No. 21855476.4, dated Nov. 20, 2023, 8 Pages.
First Office Action for Japanese Application No. 2023-509553, dated Mar. 22, 2024, 5 Pages.

* cited by examiner

RESOURCE TRANSMISSION METHOD, RESOURCE TRANSMISSION APPARATUS, AND COMMUNICATIONS DEVICE

CROSS-REFERENCE TO RELATED APPLICATIONS

This application is a continuation of International Application No. PCT/CN2021/111499 filed on Aug. 9, 2021, which claims priority to Chinese Patent Application No. CN/202010809437.5, filed on Aug. 12, 2020, which are incorporated herein by reference in their entireties.

TECHNICAL FIELD

This application pertains to the field of communications technologies, and specifically relates to a resource transmission method, a resource transmission apparatus, and a communications device.

BACKGROUND

In a communication system, there are dynamic grant based uplink transmission and configured grant based uplink transmission. For dynamic grant based uplink transmission, transmission parameters are dynamically indicated by physical layer signaling; and for configured grant based uplink transmission, transmission parameters are semi-statically configured by a higher layer or jointly configured and indicated by a higher layer and the physical layer. At present, according to relevant protocols, a terminal can only use a fixed uplink transmission mode on an unlicensed frequency band. It can be seen that terminals have poor flexibility in uplink transmission on an unlicensed frequency band.

SUMMARY

This application provides a resource transmission method, a resource transmission apparatus, and a communications device.

According to a first aspect, a resource transmission method is provided. The method is applied to a terminal and includes:
  obtaining first information, where the first information includes at least one of configuration information and scheduling information for uplink transmission; and
  determining an uplink transmission mode based on the first information, where the uplink transmission mode supports frequency hopping on an unlicensed frequency band, or the uplink transmission mode does not support frequency hopping on the unlicensed frequency band.

According to a second aspect, a resource transmission method is provided. The method is applied to a network-side device and includes:
  transmitting first information to a terminal; where
  the first information includes at least one of configuration information and scheduling information for uplink transmission, the first information is used to indicate an uplink transmission mode for the terminal, and the uplink transmission mode supports frequency hopping on an unlicensed frequency band, or the uplink transmission mode does not support frequency hopping on the unlicensed frequency band.

According to a third aspect, a resource transmission apparatus is provided. The apparatus is applied to a terminal and includes:
  an obtaining module, configured to obtain first information, where the first information includes at least one of configuration information and scheduling information for uplink transmission; and
  a determining module, configured to determine an uplink transmission mode based on the first information, where the uplink transmission mode supports frequency hopping on an unlicensed frequency band, or the uplink transmission mode does not support frequency hopping on the unlicensed frequency band.

According to a fourth aspect, a resource transmission apparatus is provided. The apparatus is applied to a network-side device and includes:
  a transmitting module, configured to transmit first information to a terminal, where
  the first information includes at least one of configuration information and scheduling information for uplink transmission, the first information is used to indicate an uplink transmission mode for the terminal, and the uplink transmission mode supports frequency hopping on an unlicensed frequency band, or the uplink transmission mode does not support frequency hopping on the unlicensed frequency band.

According to a fifth aspect, a communications device is provided, including a processor, a memory, and a program or instruction stored in the memory and capable of running on the processor, where when the program or instruction is executed by the processor, the steps of the resource transmission method according to the first aspect are implemented, or the steps of the resource transmission method according to the second aspect are implemented.

According to a sixth aspect, a readable storage medium is provided, where the readable storage medium stores program or instructions, and when the program or instructions are executed by a processor, the steps of the resource transmission method according to the first aspect are implemented, or the steps of the resource transmission method according to the second aspect are implemented.

According to a seventh aspect, a chip is provided, where the chip includes a processor and a communications interface, the communications interface is coupled to the processor, and the processor is configured to run a program or instructions to implement the resource transmission method according to the first aspect, or implement the resource transmission method according to the second aspect.

According to an eighth aspect, a computer program product is provided, stored in a readable storage medium, where the computer program product is executed by at least one processor to implement the steps of the resource transmission method according to the first aspect or the resource transmission method according to the second aspect.

According to a ninth aspect, a communications device is provided, where the communications device is configured to perform the resource transmission method according to the first aspect or the resource transmission method according to the second aspect.

DETAILED DESCRIPTION

The following clearly describes the technical solutions in the embodiments of this application with reference to the accompanying drawings in the embodiments of this application. Apparently, the described embodiments are some rather than all of the embodiments of this application. All other embodiments obtained by persons of ordinary skill in the art based on the embodiments of this application without creative efforts shall fall within the protection scope of this application.

The terms "first", "second", and the like in this specification and claims of this application are used to distinguish between similar objects rather than to describe a specific order or sequence. It should be understood that data used in this way is used interchangeably in appropriate circumstances so that the embodiments of this application can be implemented in other orders than the order illustrated or described herein. In addition, "first" and "second" are usually used to distinguish objects of a same type, and do not restrict a quantity of objects. For example, there may be one or a plurality of first objects. In addition, "and/or" in the specification and claims represents at least one of connected objects, and the character "/" generally indicates an "or" relationship between the associated objects.

It should be noted that the technologies described in the embodiments of this application are not limited to long term evolution (LTE)/LTE-Advanced (LTE-A) systems, and may also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably. The technology described may be used in the above-mentioned systems and radio technologies as well as other systems and radio technologies. However, in the following descriptions, a new radio (NR) system is described for an illustration purpose, and NR terms are used in most of the following descriptions, although these technologies may also be applied to other applications than an NR system application, such as a sixth generation ($6^{th}$ Generation, 6G) communications system.

Figure 1:
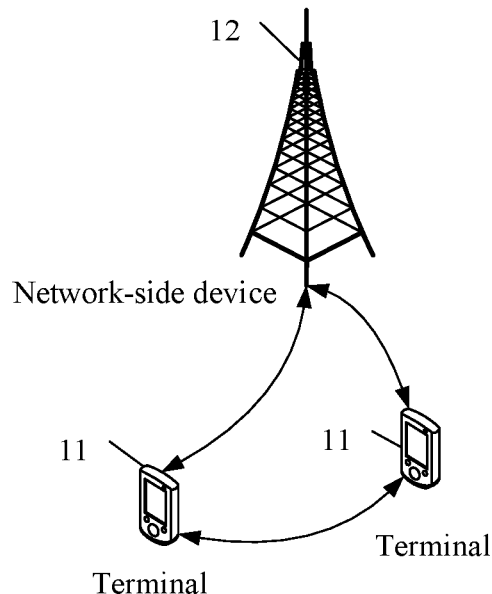
FIG. 1 is a block diagram of a wireless communications system to which an embodiment of this application is applicable.

FIG. 1 is a block diagram of a wireless communications system to which an embodiment of this application is applicable. The wireless communications system includes a terminal 11 and a network-side device 12. The terminal 11 may also be referred to as a terminal device or user terminal (User Equipment, UE). The terminal 11 may be a terminal-side device such as a mobile phone, a tablet personal computer, a laptop computer also referred to as a notebook computer, a personal digital assistant (PDA), a palmtop computer, a netbook, an ultra-mobile personal computer (UMPC), a mobile internet device (MID), a wearable device or vehicle user equipment (VUE), or pedestrian user equipment (PUE). The wearable device includes a wristband, earphones, glasses, and the like. It should be noted that a specific type of the terminal 11 is not limited in the embodiments of this application. The network-side device 12 may be a base station or a core network, where the base station may be referred to as a NodeB, an evolved NodeB (eNB), an access point, a base transceiver station (BTS), a radio base station, a radio transceiver, a basic service set (BSS), an extended service set (ESS), a home NodeB, a home evolved NodeB, a WLAN access point, a Wi-Fi node, a transmission-reception point (TRP), or another appropriate term in the art. As long as the same technical effect is achieved, the base station is not limited to a specific technical term. It should be noted that the base station in the NR system is taken only as an example in the embodiments of this application, but a specific type of the base station is not limited.

The following describes in detail a resource transmission method provided in the embodiments of this application by using specific embodiments and application scenarios thereof with reference to the accompanying drawings.

Figure 2:
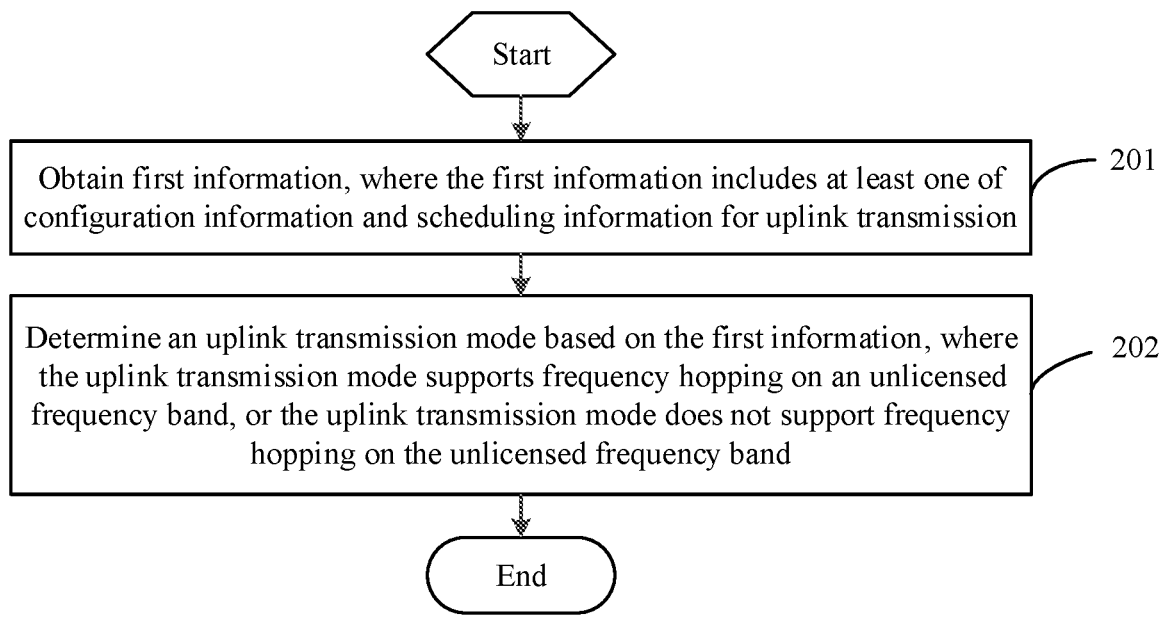
FIG. 2 is a flowchart of a resource transmission method according to an embodiment of this application.

Refer to FIG. 2. FIG. 2 is a flowchart of a resource transmission method according to an embodiment of this application. The resource transmission method is applied to a terminal. As shown in FIG. 2, the resource transmission method includes the following steps.

Step 201. Obtain first information, where the first information includes at least one of configuration information and scheduling information for uplink transmission.

The configuration information may be used to indicate whether the terminal supports frequency hopping on an unlicensed frequency band. For example, the configuration information indicates that the terminal supports frequency hopping on the unlicensed frequency band. In this case, the first information further includes scheduling information for uplink transmission, and the scheduling information is used to indicate an uplink transmission mode of the terminal on the unlicensed frequency band. Alternatively, the configuration information indicates that the terminal does not support frequency hopping on the unlicensed frequency band. In this case, the first information includes no scheduling information for uplink transmission. It should be noted that the first information may alternatively include only scheduling information for uplink transmission, and the scheduling information may indicate that the terminal supports frequency hopping on the unlicensed frequency band.

In this embodiment of this application, the first information satisfies at least one of the following:

being configured by a network-side device; and being specified by a protocol.

In other words, the first information may be configured by a network-side device and transmitted to the terminal, or the first information may be based on protocol specification.

Step 202. Determine an uplink transmission mode based on the first information, where the uplink transmission mode supports frequency hopping on an unlicensed frequency band, or the uplink transmission mode does not support frequency hopping on the unlicensed frequency band.

It can be understood that after obtaining the first information, the terminal determines, based on the configuration information and/or the scheduling information for uplink transmission in the first information, whether frequency hopping on the unlicensed frequency band is supported. For example, if the configuration information indicates that the terminal does not support frequency hopping on the unlicensed frequency band, no frequency hopping is performed for uplink transmission of the terminal on the unlicensed frequency band. If the first information indicates that the terminal supports frequency hopping on the unlicensed frequency band, the terminal implements the uplink transmission on the unlicensed frequency band in a frequency hopping pattern.

It should be noted that the scheduling information can also indicate transmission parameters of the terminal such as an uplink transmission type, a transmission length of a physical uplink shared channel (PUSCH), a transmission start symbol, and a PUSCH candidate transmission location. The following describes an optional embodiment of the scheduling information in the embodiment of this application.

Optionally, in a case that the scheduling information indicates that the uplink transmission is a configured grant based (CG) PUSCH and that a number of candidate PUSCHs in a slot is 1, the uplink transmission mode supports intra-slot frequency hopping on the unlicensed frequency band. The number of candidate PUSCHs in a slot may be indicated by cg-nrofPUSCH-InSlot in the scheduling information.

Figure 2A:
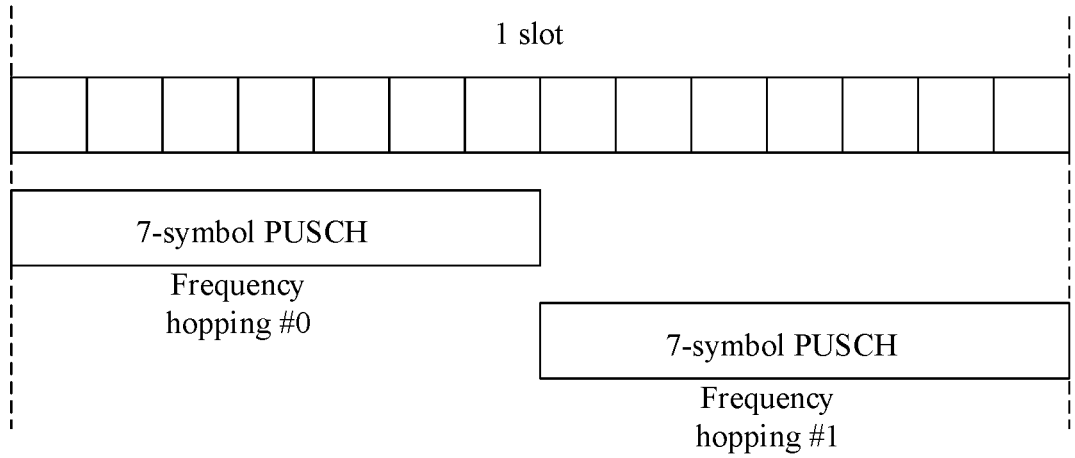
FIG. 2a is a schematic diagram of an uplink transmission mode in a resource transmission method according to an embodiment of this application.
Figure 2B:
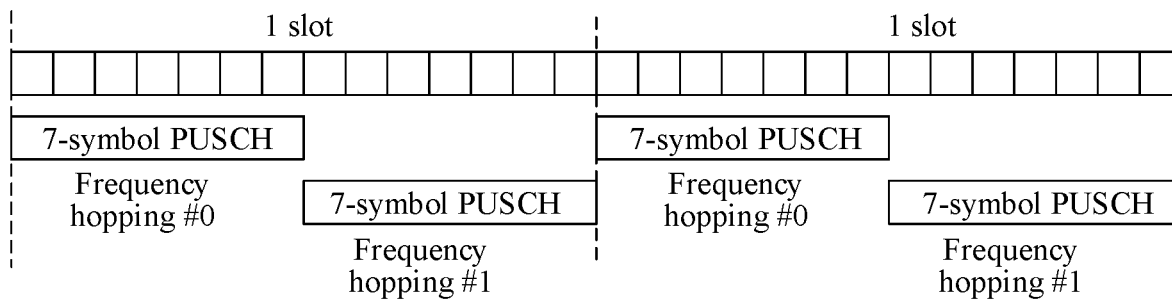
FIG. 2b is a schematic diagram of another uplink transmission mode in a resource transmission method according to an embodiment of this application.

In this embodiment, for the CG PUSCH, when cg-nrofPUSCH-InSlot=1, the terminal can support intra-slot frequency hopping on the unlicensed frequency band. It should be noted that the intra-slot frequency hopping is applicable to single-slot uplink transmission and multi-slot uplink transmission. When a number K of repetitions of the PUSCH is 1, as shown in FIG. 2a, the PUSCH has a length of 7 symbols, and an uplink transmission mode of the PUSCH is intra-slot frequency hopping in a single slot. When the number of repetitions of the PUSCH is greater than 1, as shown in FIG. 2b, the number K of repetitions of the PUSCH is 2, and the uplink transmission mode of the PUSCH is intra-slot frequency hopping in multiple time slots.

Optionally, in a case that the scheduling information indicates that the uplink transmission is a configured grant based PUSCH, that a number of candidate PUSCHs in a slot is 1, and that a number of consecutive slots is greater than 1, the uplink transmission mode supports intra-slot frequency hopping and/or inter-slot frequency hopping on the unlicensed frequency band. The number of consecutive slots may be indicated by cg-nrofSlots-r16 in the scheduling information.

Figure 2C:
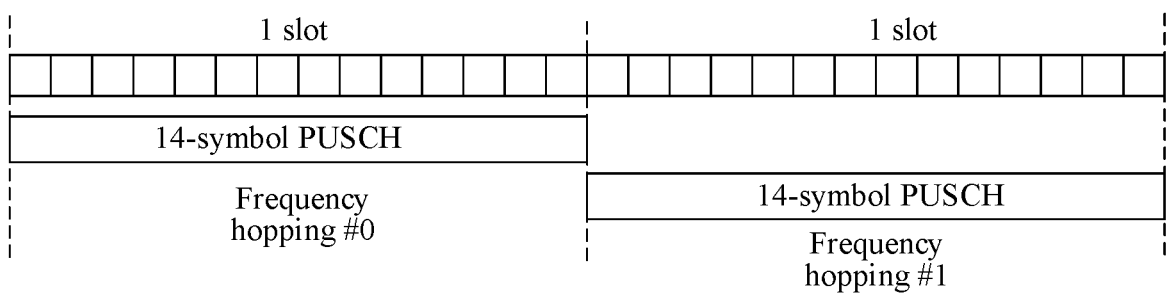
FIG. 2c is a schematic diagram of another uplink transmission mode in a resource transmission method according to an embodiment of this application.

In this embodiment, for the CG PUSCH, when cg-nrofPUSCH-InSlot=1 and cg-nrofSlots-r16>1, the terminal can support both intra-slot frequency hopping on the unlicensed frequency band and inter-slot frequency hopping on the unlicensed frequency band. It should be noted that a frequency hopping pattern of the intra-slot frequency hopping and/or inter-slot frequency hopping may be configured by a network-side device. As shown in FIG. 2c, the PUSCH has a length of 14 symbols, the number K of repetitions of the PUSCH is 2, and the uplink transmission mode of the PUSCH is inter-slot frequency hopping.

Optionally, in a case that the scheduling information indicates that the uplink transmission is a dynamic grant based (DG) PUSCH, and that a first preset condition is satisfied, the uplink transmission mode supports intra-slot frequency hopping on the unlicensed frequency band.

The first preset condition includes at least one of the following:

the terminal being not configured with a PUSCH aggregation factor;

a number of repetitions of the dynamic grant based PUSCH being 1;

scheduling of one PUSCH being permitted in uplink scheduling; and scheduling of at least two PUSCHs being permitted in uplink scheduling, and time-domain resources for the at least two PUSCHs scheduled being located in at least one slot.

It should be noted that the PUSCH aggregation factor may be indicated by pusch-Aggregation Factor in the scheduling information, and the number of repetitions of the PUSCH may be indicated by number of repetitions in the scheduling information.

For example, for the DG PUSCH, when the scheduling information indicates that the number of repetitions of the PUSCH is 1, that scheduling of at least two PUSCHs is permitted in uplink scheduling, and that time-domain resources for the at least two PUSCHs scheduled are located in a same slot, the terminal supports intra-slot frequency hopping of the PUSCH. Alternatively, for the DG PUSCH, when the scheduling information indicates that no PUSCH aggregation factor is configured and that scheduling of one PUSCH is permitted in uplink scheduling, the terminal supports intra-slot frequency hopping of the PUSCH. Certainly, the first preset condition indicated in the scheduling information may alternatively be in other specific forms, which are not enumerated in this application.

Optionally, in a case that the scheduling information indicates that the uplink transmission is a dynamic grant based PUSCH and that a second preset condition is satisfied, the uplink transmission mode supports intra-slot frequency hopping and/or inter-slot frequency hopping on the unlicensed frequency band.

The second preset condition includes at least one of the following:
- the terminal being configured with a PUSCH aggregation factor;
- a number of repetitions of the dynamic grant based PUSCH being greater than 1;
- scheduling of one PUSCH being permitted in uplink scheduling; and
- scheduling of at least two PUSCHs being permitted in uplink scheduling, and time-domain resources for the at least two PUSCHs scheduled being located in at least one slot.

In other words, for the DG PUSCH, when at least one item of the second preset condition is indicated in the scheduling information, the terminal supports intra-slot frequency hopping and/or inter-slot frequency hopping of the PUSCH. For example, when the scheduling information indicates that a PUSCH aggregation factor is configured by a higher layer, the terminal supports intra-slot frequency hopping of the PUSCH. Alternatively, when the scheduling information indicates that the number K of repetitions of the PUSCH is 2, that scheduling of at least two PUSCHs is permitted in uplink scheduling, and that time-domain resources for the at least two PUSCHs scheduled are located in different slots, the terminal supports inter-slot frequency hopping of the PUSCH. Certainly, the second preset condition indicated in the scheduling information may alternatively be in other specific forms, which are not enumerated in this application.

A frequency hopping pattern of the intra-slot frequency hopping and/or inter-slot frequency hopping may be configured by a network-side device. For example, the network-side device may transmit the configuration information to the terminal, to indicate that the terminal is to use which frequency hopping pattern for intra-slot frequency hopping and/or inter-slot frequency hopping. For specifics of the frequency hopping pattern, reference may be made to descriptions in subsequent embodiments.

It should be noted that, in a case that scheduling of at least two PUSCHs is permitted in uplink scheduling, and that time-domain resources for the at least two PUSCHs scheduled are located in at least one slot, the terminal transmits only PUSCH(s) in a first slot. In other words, regardless of whether the time-domain resources for the at least two PUSCHs are located in a same slot or different slots, the terminal transmits only PUSCH(s) in a first slot.

Further, the terminal may transmit same or different PUSCHs in one dynamic scheduling and/or one configured grant period.

In this embodiment of this application, in a case that the terminal determines that the uplink transmission mode supports frequency hopping on the unlicensed frequency band, the uplink transmission mode supports at least one of the following frequency hopping patterns:
- intra-PUSCH frequency hopping;
- intra-slot frequency hopping for at least two PUSCHs;
- consecutive inter-PUSCH frequency hopping; and
- inter-slot frequency hopping.

A time location for frequency hopping is determined based on at least one of the following:
- an actual PUSCH transmission location; and
- a configured PUSCH candidate transmission location.

The following will describe the four frequency hopping patterns in specific embodiments.

Figure 2D:
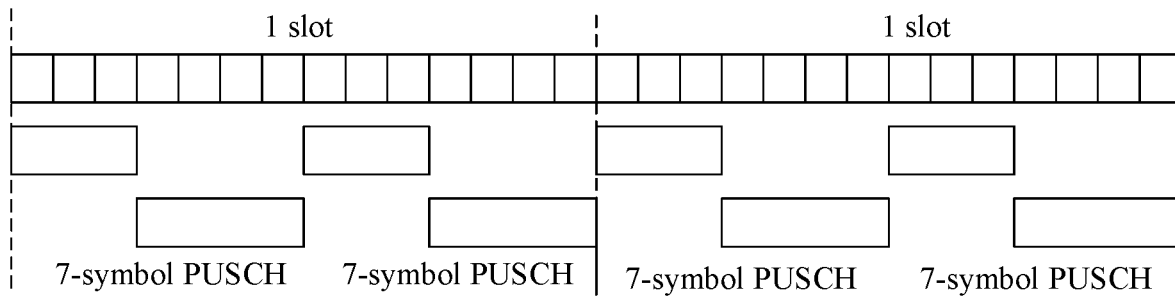
FIG. 2d is a schematic diagram of another uplink transmission mode in a resource transmission method according to an embodiment of this application.

In a first embodiment, the uplink transmission mode of the terminal supports intra-PUSCH frequency hopping. Refer to FIG. 2d. One PUSCH occupies 7 orthogonal frequency division multiplexing (OFDM) symbols in time. The intra-PUSCH frequency hopping means that one PUSCH hops in two frequency bands. The first hop may occupy $\lfloor N_{symb}^{PUSCH,s}/2 \rfloor$ symbols, the second hop occupies $N_{symb}^{PUSCH,s} - \lfloor N_{symb}^{PUSCH,s}/2 \rfloor$ symbols, and $N_{symb}^{PUSCH,s}$ is a total number of symbols occupied by one PUSCH in time. As shown in FIG. 2d, the first hop occupies 3 symbols in time, and the second hop occupies 4 symbols in time, so as to implement intra-PUSCH frequency hopping. In FIG. 2d, the number K of repetitions of the PUSCH is 4.

In a second embodiment, in a case that the frequency hopping pattern supported by the terminal is the intra-slot frequency hopping for at least two PUSCHs, a time location for intra-slot frequency hopping (second-hop location) is determined based on the PUSCH actually transmitted. In this embodiment, the location for intra-slot frequency hopping is determined based on the PUSCH actually transmitted. N/2 PUSCHs are transmitted in the first hop in the slot, and (N−N/2) PUSCHs are transmitted in the second hop, where N is the number of PUSCHs actually transmitted in the slot.

Figure 2E:
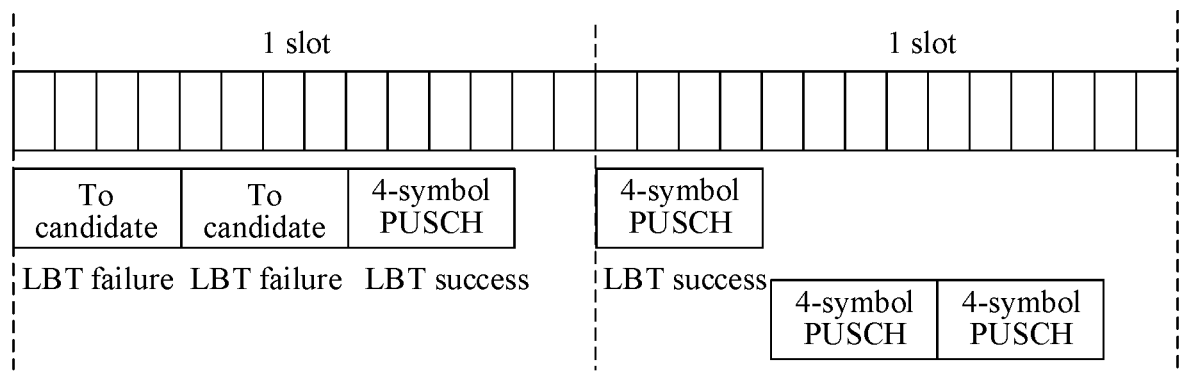
FIG. 2e is a schematic diagram of another uplink transmission mode in a resource transmission method according to an embodiment of this application.

Refer to FIG. 2e. One PUSCH occupies 4 OFDM symbols in time. Failure occurs at the first two PUSCH candidate transmission locations in the first slot, which means that no PUSCH is actually transmitted. The number of PUSCHs actually transmitted in the first slot is 1, and the PUSCH does not hop in the first slot. The number of PUSCHs actually transmitted in the second slot is 3, the first hop and the second hop in this slot have a same value, and both a second PUSCH and a third PUSCH are transmitted in a second frequency band.

In a third embodiment, in a case that the frequency hopping pattern supported by the terminal is the intra-slot frequency hopping for at least two PUSCHs, a second-hop location for intra-slot frequency hopping is determined according to a configured PUSCH candidate transmission location. In this embodiment, the time location for intra-slot frequency hopping is determined based on the PUSCH actually transmitted. N/2 PUSCHs are transmitted in the first hop in the slot, and (N−N/2) PUSCHs are transmitted in the second hop, where N is the number of PUSCHs actually transmitted in the slot.

Figure 2F:
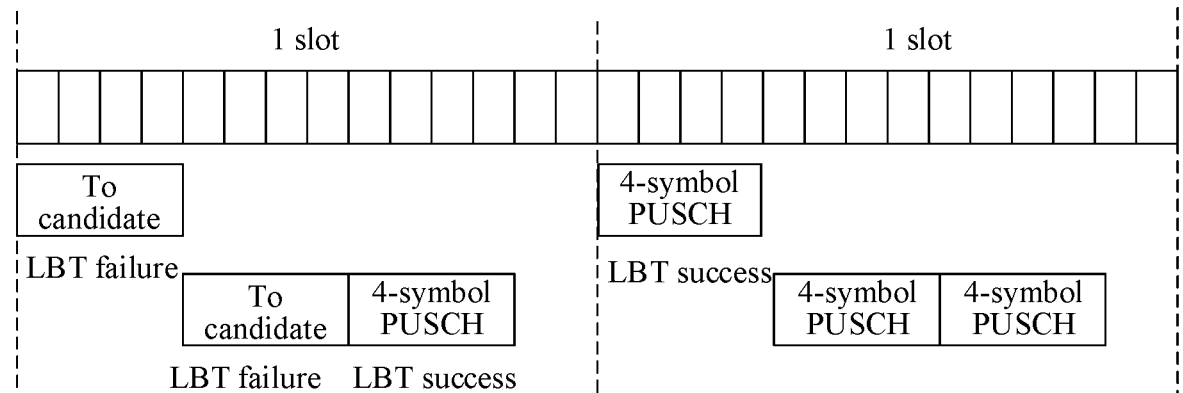
FIG. 2f is a schematic diagram of another uplink transmission mode in a resource transmission method according to an embodiment of this application.

Refer to FIG. 2f. One PUSCH occupies 4 OFDM symbols in time. Failure occurs at the first two PUSCH candidate transmission locations in the first slot, which means that no PUSCH is actually transmitted. The number of PUSCHs actually transmitted in the first slot is 1, a location for frequency hopping in this slot is determined according to a configured PUSCH candidate transmission location, and then a transmission location of the PUSCH actually transmitted in the first slot is therefore as shown in FIG. 2e. The number of PUSCHs actually transmitted in the second slot is 3, the first hop and the second hop in this slot have a same value, and both a second PUSCH and a third PUSCH are transmitted in a second frequency band.

Figure 2G:
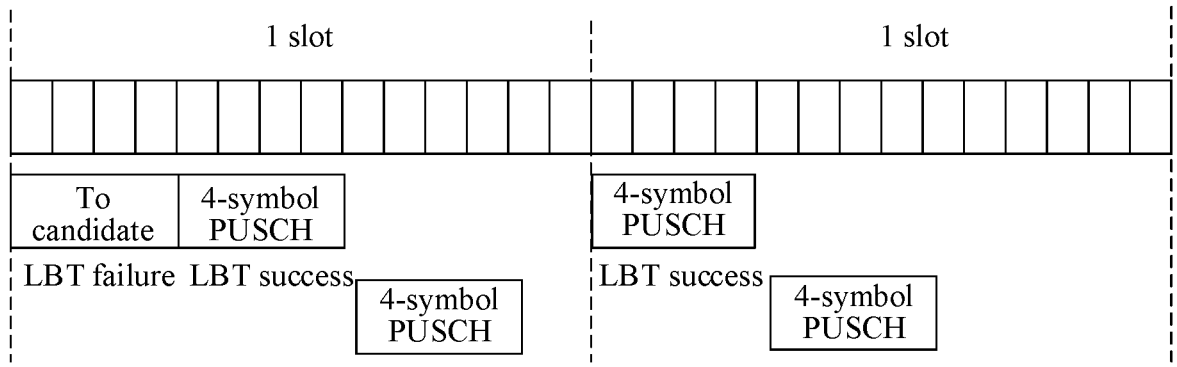
FIG. 2g is a schematic diagram of another uplink transmission mode in a resource transmission method according to an embodiment of this application.

In a fourth embodiment, in a case that the frequency hopping pattern supported by the terminal is the consecutive inter-PUSCH frequency hopping, a time location for frequency hopping is determined based on the PUSCH actually transmitted. Refer to FIG. 2g. One PUSCH occupies 4 OFDM symbols in time. Failure occurs at the first PUSCH candidate transmission location in the first slot, which means that no PUSCH is actually transmitted. The number of PUSCHs actually transmitted in the first slot is 2. A time location for frequency hopping in this slot is determined based on a first PUSCH actually transmitted. The first PUSCH is on the first frequency band, and then the second PUSCH is on the second frequency band. The frequency hopping pattern in this embodiment is consecutive inter-PUSCH frequency hopping. The number of repetitions of the PUSCH is 4, and a first PUSCH in the second slot (that is, a third PUSCH) hops relative to a last PUSCH in the first slot. In this way, transmission locations of the 4 PUSCHs in slots are determined, as shown in FIG. 2g.

Figure 2H:
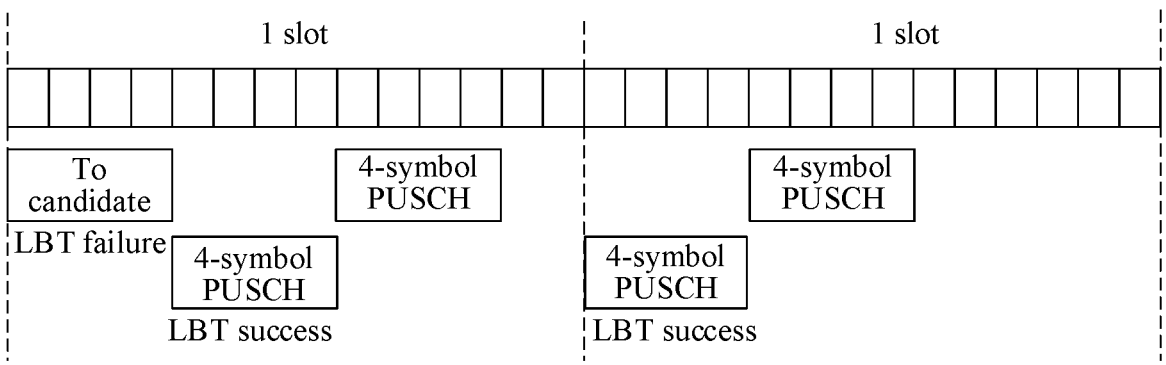
FIG. 2h is a schematic diagram of another uplink transmission mode in a resource transmission method according to an embodiment of this application.

In a fifth embodiment, in a case that the frequency hopping pattern supported by the terminal is the consecutive inter-PUSCH frequency hopping, a time location for frequency hopping is determined based on a configured PUSCH candidate transmission location. Refer to FIG. 2h. One PUSCH occupies 4 OFDM symbols in time. Failure occurs at the first PUSCH candidate transmission location in the first slot, which means that no PUSCH is actually transmitted. A transmission location of the PUSCH for frequency hopping in this slot is determined based on the configured PUSCH candidate transmission location, and a transmission location of the first PUSCH in the first slot is therefore as shown in FIG. 2h. The frequency hopping pattern in this embodiment is consecutive inter-PUSCH frequency hopping. The number of repetitions of the PUSCH is 4, and transmission locations of three other subsequent PUSCHs are therefore determined based on the first PUSCH, as shown in FIG. 2h.

Figure 2I:
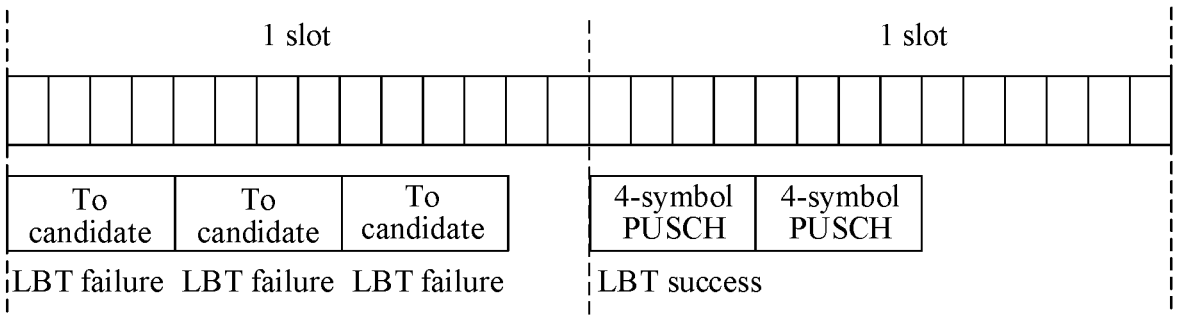
FIG. 2i is a schematic diagram of another uplink transmission mode in a resource transmission method according to an embodiment of this application.

In a sixth embodiment, in a case that the frequency hopping pattern supported by the terminal is inter-slot frequency hopping, a time location for frequency hopping is determined based on the PUSCH actually transmitted. Refer to FIG. 2i. One PUSCH occupies 4 OFDM symbols in time. Failure occurs at all three PUSCH candidate transmission locations in the first slot, which means that no PUSCH is actually transmitted in the first slot. Transmission of the PUSCH starts from the second slot. In this embodiment, the frequency hopping pattern is inter-slot frequency hopping, the number of repetitions of the PUSCH is 2, and two PUSCHs can be transmitted in one slot, so there is no frequency hopping in the slot.

Figure 2J:
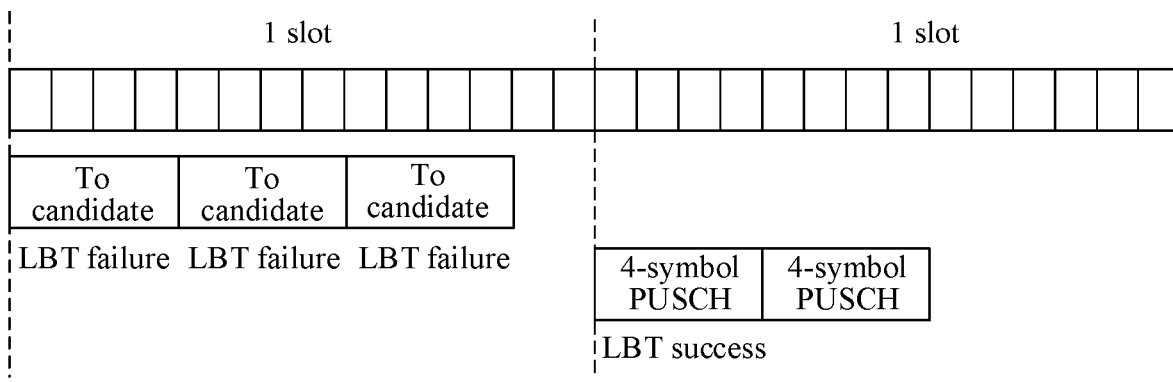
FIG. 2j is a schematic diagram of another uplink transmission mode in a resource transmission method according to an embodiment of this application.

In a seventh embodiment, in a case that the frequency hopping pattern supported by the terminal is inter-slot frequency hopping, a time location for frequency hopping is determined according to a configured PUSCH candidate transmission location. Refer to FIG. 2j. One PUSCH occupies 4 OFDM symbols in time. Failure occurs at all three PUSCH candidate transmission locations in the first slot, which means that no PUSCH is actually transmitted in the first slot. Transmission of the PUSCH starts from the second slot. In this embodiment, the frequency hopping pattern is inter-slot frequency hopping, a time location for frequency hopping is determined according to the configured PUSCH candidate transmission location, and then a PUSCH in the second slot hops relative to a PUSCH in the first slot. In this embodiment, the number of repetitions of the PUSCH is 2, and two PUSCHs can be transmitted in one slot, so there is no frequency hopping in the slot.

It should be noted that the foregoing frequency hopping patterns may be configured by a network-side device. For example, the network-side device may transmit the configuration information to the terminal to indicate a frequency hopping pattern supported by the terminal. In addition, in the frequency hopping patterns provided in this embodiment of this application, the terminal can transmit same or different PUSCHs in one dynamic scheduling and/or one configured grant period.

In the solution provided in this embodiment of this application, the terminal obtains configuration information and/or scheduling information for uplink transmission, and then determines an uplink transmission mode, where the uplink transmission mode supports frequency hopping on an unlicensed frequency band, or the uplink transmission mode does not support frequency hopping on the unlicensed frequency band. In this way, behaviors of the terminal on the unlicensed frequency band are defined so that two uplink transmission modes, frequency hopping or no frequency hopping, on the unlicensed frequency band can be implemented by the terminal, enhancing flexibility of the terminal in uplink transmission on the unlicensed frequency band.

Figure 3:
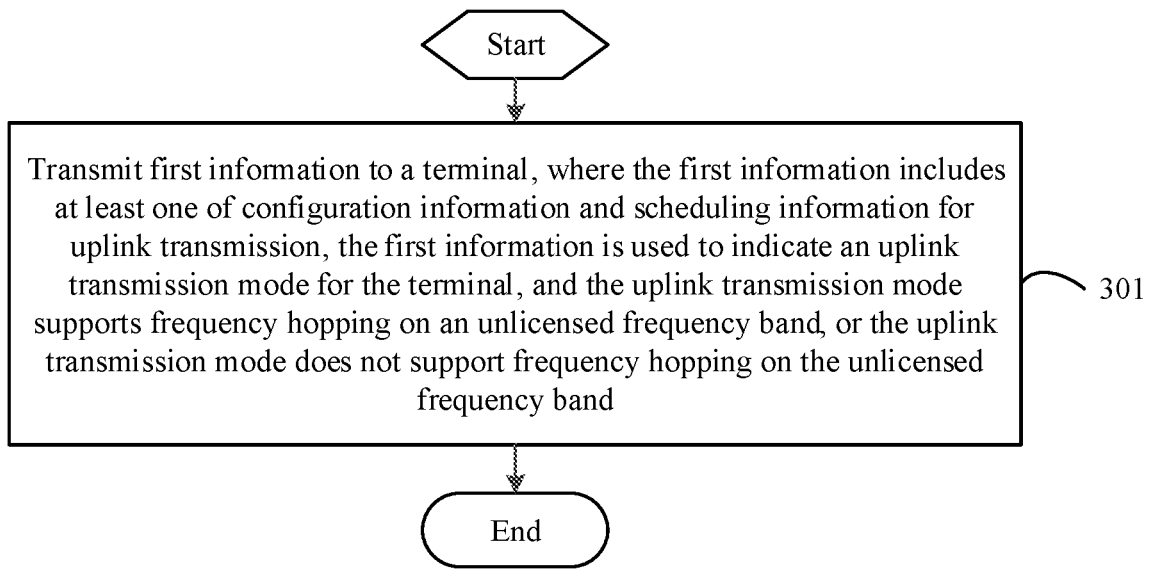
FIG. 3 is a flowchart of another resource transmission method according to an embodiment of this application.

Refer to FIG. 3. FIG. 3 is a flowchart of another resource transmission method according to an embodiment of this application. The resource transmission method is applied to a network-side device. As shown in FIG. 3, the resource transmission method includes the following step:

Step 301. Transmit first information to a terminal, where the first information includes at least one of configuration information and scheduling information for uplink transmission, the first information is used to indicate an uplink transmission mode for the terminal, and the uplink transmission mode supports frequency hopping on an unlicensed frequency band, or the uplink transmission mode does not support frequency hopping on the unlicensed frequency band.

Optionally, in a case that the scheduling information indicates that the uplink transmission is a configured grant based physical uplink shared channel PUSCH and that a number of candidate PUSCHs in a slot is 1, the uplink transmission mode supports intra-slot frequency hopping on the unlicensed frequency band.

Optionally, in a case that the scheduling information indicates that the uplink transmission is a configured grant based PUSCH, that a number of candidate PUSCHs in a slot is 1, and that a number of consecutive slots is greater than 1, the uplink transmission mode supports intra-slot frequency hopping and/or inter-slot frequency hopping on the unlicensed frequency band.

Optionally, in a case that the scheduling information indicates that the uplink transmission is a dynamic grant based PUSCH, and that a first preset condition is satisfied, the uplink transmission mode supports intra-slot frequency hopping on the unlicensed frequency band.

The first preset condition includes at least one of the following:
  the terminal being not configured with a PUSCH aggregation factor;
  a number of repetitions of the dynamic grant based PUSCH being 1;
  scheduling of one PUSCH being permitted in uplink scheduling; and
  scheduling of at least two PUSCHs being permitted in uplink scheduling, and time-domain resources for the at least two PUSCHs scheduled being located in at least one slot.

Optionally, in a case that the scheduling information indicates that the uplink transmission is a dynamic grant based PUSCH and that a second preset condition is satisfied, the uplink transmission mode supports intra-slot frequency hopping and/or inter-slot frequency hopping on the unlicensed frequency band.

The second preset condition includes at least one of the following:
  the terminal being configured with a PUSCH aggregation factor;
  a number of repetitions of the dynamic grant based PUSCH being greater than 1;

scheduling of one PUSCH being permitted in uplink scheduling; and scheduling of at least two PUSCHs being permitted in uplink scheduling, and time-domain resources for the at least two PUSCHs scheduled being located in at least one slot.

Optionally, in a case that scheduling of at least two PUSCHs is permitted in uplink scheduling, and that time-domain resources for the at least two PUSCHs scheduled are located in at least one slot, the first information is used to indicate that the terminal transmits only PUSCH(s) in a first slot.

Optionally, in a case that the uplink transmission mode supports frequency hopping on the unlicensed frequency band, the uplink transmission mode supports at least one of the following frequency hopping patterns:

intra-PUSCH frequency hopping;
intra-slot frequency hopping for at least two PUSCHs;
consecutive inter-PUSCH frequency hopping; and
inter-slot frequency hopping.

Optionally, a time location for frequency hopping is determined based on at least one of the following:

an actual PUSCH transmission location; and
a configured PUSCH candidate transmission location.

Optionally, in the frequency hopping patterns, the terminal transmits same or different PUSCHs in one dynamic scheduling and/or one configured grant period.

It should be noted that, for the foregoing optional embodiments, reference may be made to the specific description in the embodiment of the resource transmission method shown in FIG. 2. Details are not repeated in this embodiment.

In this embodiment of this application, the network-side device transmits first information to a terminal, where the first information is used to indicate an uplink transmission mode for the terminal, and the uplink transmission mode supports frequency hopping on an unlicensed frequency band, or the uplink transmission mode does not support frequency hopping on the unlicensed frequency band. In this way, behaviors of the terminal on the unlicensed frequency band are defined so that two uplink transmission modes, frequency hopping or no frequency hopping, on the unlicensed frequency band can be implemented by the terminal, enhancing flexibility of the terminal in uplink transmission on the unlicensed frequency band.

It should be noted that the resource transmission method may be performed by a resource transmission apparatus, or a control module in the resource transmission apparatus for performing the resource transmission method. In this embodiment of this application, the resource transmission apparatus performing the resource transmission method is used as an example to describe the resource transmission apparatus provided in this embodiment of this application.

Figure 4:
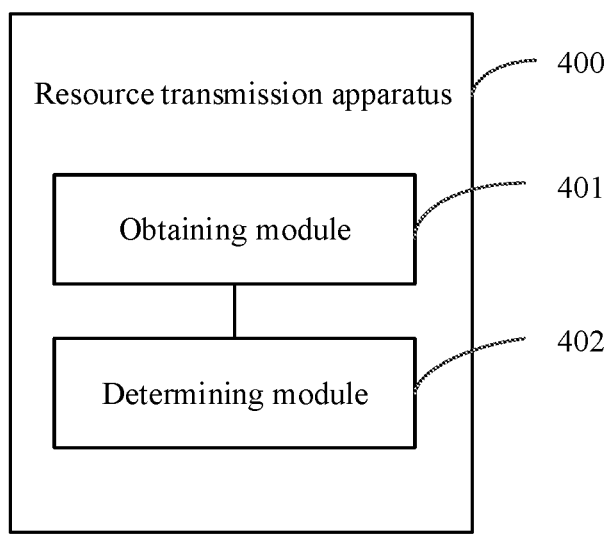
FIG. 4 is a structural diagram of a resource transmission apparatus according to an embodiment of this application.

Refer to FIG. 4. FIG. 4 is a structural diagram of a resource transmission apparatus according to an embodiment of this application. The resource transmission apparatus may be applied to a terminal. Optionally, the resource transmission apparatus includes a processor. As shown in FIG. 4, the resource transmission apparatus 400 may include:

an obtaining module 401, configured to obtain first information, where the first information includes at least one of configuration information and scheduling information for uplink transmission; and a determining module 402, configured to determine an uplink transmission mode based on the first information, where the uplink transmission mode supports frequency hopping on an unlicensed frequency band, or the uplink transmission mode does not support frequency hopping on the unlicensed frequency band.

Optionally, the first information satisfies any one of the following:

being configured by a network-side device; and
being specified by a protocol.

Optionally, in a case that the scheduling information indicates that the uplink transmission is a configured grant based physical uplink shared channel PUSCH and that a number of candidate PUSCHs in a slot is 1, the uplink transmission mode supports intra-slot frequency hopping on the unlicensed frequency band.

Optionally, in a case that the scheduling information indicates that the uplink transmission is a configured grant based PUSCH, that a number of candidate PUSCHs in a slot is 1, and that a number of consecutive slots is greater than 1, the uplink transmission mode supports intra-slot frequency hopping and/or inter-slot frequency hopping on the unlicensed frequency band.

Optionally, in a case that the scheduling information indicates that the uplink transmission is a dynamic grant based PUSCH, and that a first preset condition is satisfied, the uplink transmission mode supports intra-slot frequency hopping on the unlicensed frequency band.

The first preset condition includes at least one of the following:

the terminal being not configured with a PUSCH aggregation factor;
a number of repetitions of the dynamic grant based PUSCH being 1;
scheduling of one PUSCH being permitted in uplink scheduling; and
scheduling of at least two PUSCHs being permitted in uplink scheduling, and time-domain resources for the at least two PUSCHs scheduled being located in at least one slot.

Optionally, in a case that the scheduling information indicates that the uplink transmission is a dynamic grant based PUSCH and that a second preset condition is satisfied, the uplink transmission mode supports intra-slot frequency hopping and/or inter-slot frequency hopping on the unlicensed frequency band.

The second preset condition includes at least one of the following:

the terminal being configured with a PUSCH aggregation factor;
a number of repetitions of the dynamic grant based PUSCH being greater than 1;
scheduling of one PUSCH being permitted in uplink scheduling; and
scheduling of at least two PUSCHs being permitted in uplink scheduling, and time-domain resources for the at least two PUSCHs scheduled being located in at least one slot.

Optionally, in a case that scheduling of at least two PUSCHs is permitted in uplink scheduling, and that time-domain resources for the at least two PUSCHs scheduled are located in at least one slot, the apparatus transmits only PUSCH(s) in a first slot.

Optionally, a frequency hopping pattern of the intra-slot frequency hopping and/or inter-slot frequency hopping is configured by a network-side device.

Optionally, in a case that the uplink transmission mode supports frequency hopping on the unlicensed frequency band, the uplink transmission mode supports at least one of the following frequency hopping patterns:

intra-PUSCH frequency hopping;
intra-slot frequency hopping for at least two PUSCHs;
consecutive inter-PUSCH frequency hopping; and
inter-slot frequency hopping.

Optionally, a time location for frequency hopping is determined based on at least one of the following:
an actual PUSCH transmission location; and
a configured PUSCH candidate transmission location.

Optionally, in the frequency hopping patterns, the apparatus transmits same or different PUSCHs in one dynamic scheduling and/or one configured grant period.

The resource transmission apparatus provided in this embodiment of this application obtains configuration information and/or scheduling information for uplink transmission in first information, and then determines an uplink transmission mode, where the uplink transmission mode supports frequency hopping on an unlicensed frequency band, or the uplink transmission mode does not support frequency hopping on the unlicensed frequency band. In this way, behaviors of the resource transmission apparatus on the unlicensed frequency band are defined so that two uplink transmission modes, frequency hopping or no frequency hopping, on the unlicensed frequency band can be implemented by the resource transmission apparatus, enhancing flexibility of the resource transmission apparatus in uplink transmission on the unlicensed frequency band.

The resource transmission apparatus in this embodiment of this application may be an apparatus, or may be a component, an integrated circuit, or a chip in a terminal. The apparatus may be a mobile terminal or a non-mobile terminal. For example, the mobile terminal may include but is not limited to the foregoing illustrated types of terminals 11. The non-mobile terminal may be a server, a network attached storage (NAS), a personal computer (PC), a television (TV), a teller machine, a self-service machine, or the like. This is not specifically limited in the embodiments of this application.

The resource transmission apparatus in this embodiment of this application may be an apparatus with an operating system. The operating system may be an android operating system, may be an iOS operating system, or may be another possible operating system. This is not specifically limited in this embodiment of this application.

The resource transmission apparatus provided in this embodiment of this application can implement the processes implemented in the embodiment of the resource transmission method in FIG. 2, with the same technical effects achieved. To avoid repetition, details are not described herein again.

Figure 5:
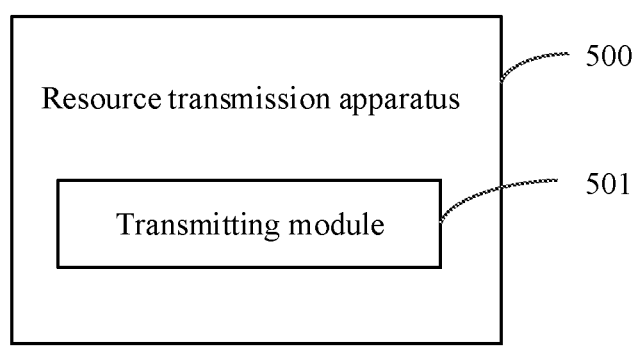
FIG. 5 is a structural diagram of another resource transmission apparatus according to an embodiment of this application.

Refer to FIG. 5. FIG. 5 is a structural diagram of another resource transmission apparatus according to an embodiment of this application. The resource transmission apparatus may be applied to a network-side device. Optionally, the resource transmission apparatus includes a processor. As shown in FIG. 5, the resource transmission apparatus 500 includes:
a transmitting module 501, configured to transmit first information to a terminal, where the first information includes at least one of configuration information and scheduling information for uplink transmission, the first information is used to indicate an uplink transmission mode for the terminal, and the uplink transmission mode supports frequency hopping on an unlicensed frequency band, or the uplink transmission mode does not support frequency hopping on the unlicensed frequency band.

Optionally, in a case that the scheduling information indicates that the uplink transmission is a configured grant based physical uplink shared channel PUSCH and that a number of candidate PUSCHs in a slot is 1, the uplink transmission mode supports intra-slot frequency hopping on the unlicensed frequency band.

Optionally, in a case that the scheduling information indicates that the uplink transmission is a configured grant based PUSCH, that a number of candidate PUSCHs in a slot is 1, and that a number of consecutive slots is greater than 1, the uplink transmission mode supports intra-slot frequency hopping and/or inter-slot frequency hopping on the unlicensed frequency band.

Optionally, in a case that the scheduling information indicates that the uplink transmission is a dynamic grant based PUSCH, and that a first preset condition is satisfied, the uplink transmission mode supports intra-slot frequency hopping on the unlicensed frequency band.

The first preset condition includes at least one of the following:
the terminal being not configured with a PUSCH aggregation factor;
a number of repetitions of the dynamic grant based PUSCH being 1;
scheduling of one PUSCH being permitted in uplink scheduling; and
scheduling of at least two PUSCHs being permitted in uplink scheduling, and time-domain resources for the at least two PUSCHs scheduled being located in at least one slot.

Optionally, in a case that the scheduling information indicates that the uplink transmission is a dynamic grant based PUSCH and that a second preset condition is satisfied, the uplink transmission mode supports intra-slot frequency hopping and/or inter-slot frequency hopping on the unlicensed frequency band.

The second preset condition includes at least one of the following:
the terminal being configured with a PUSCH aggregation factor;
a number of repetitions of the dynamic grant based PUSCH being greater than 1;
scheduling of one PUSCH being permitted in uplink scheduling; and
scheduling of at least two PUSCHs being permitted in uplink scheduling, and time-domain resources for the at least two PUSCHs scheduled being located in at least one slot.

Optionally, in a case that scheduling of at least two PUSCHs is permitted in uplink scheduling, and that time-domain resources for the at least two PUSCHs scheduled are located in at least one slot, the first information is used to indicate that the terminal transmits only PUSCH(s) in a first slot.

Optionally, in a case that the uplink transmission mode supports frequency hopping on the unlicensed frequency band, the uplink transmission mode supports at least one of the following frequency hopping patterns:
intra-PUSCH frequency hopping;
intra-slot frequency hopping for at least two PUSCHs;
consecutive inter-PUSCH frequency hopping; and
inter-slot frequency hopping.

Optionally, a time location for frequency hopping is determined based on at least one of the following:
an actual PUSCH transmission location; and
a configured PUSCH candidate transmission location.

Optionally, in the frequency hopping patterns, the apparatus transmits same or different PUSCHs in one dynamic scheduling and/or one configured grant period.

The resource transmission apparatus provided in this embodiment of this application transmits first information to a terminal, where the first information is used to indicate an uplink transmission mode for the terminal, and the uplink transmission mode supports frequency hopping on an unlicensed frequency band, or the uplink transmission mode does not support frequency hopping on the unlicensed frequency band. In this way, behaviors of the terminal on the unlicensed frequency band are defined through the resource transmission apparatus so that two uplink transmission modes, frequency hopping or no frequency hopping, on the unlicensed frequency band can be implemented by the terminal, enhancing flexibility of the terminal in uplink transmission on the unlicensed frequency band.

The resource transmission apparatus provided in this embodiment of this application can implement the processes implemented in the foregoing embodiment of the resource transmission method in FIG. 3, with the same technical effects achieved. To avoid repetition, details are not described herein again.

Figure 6:
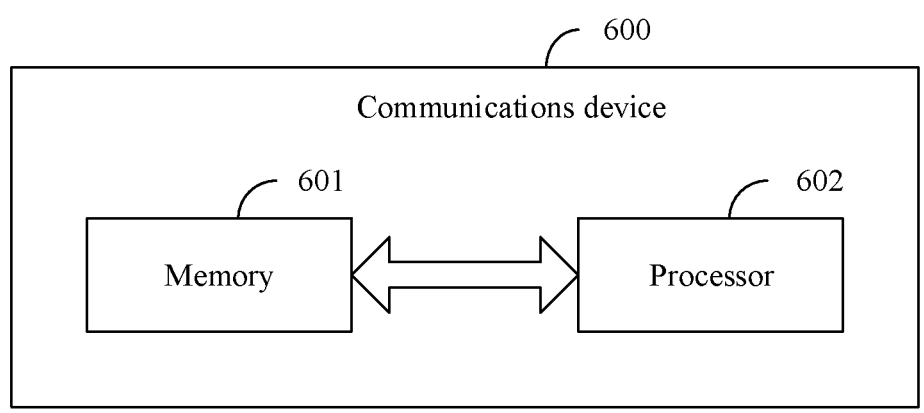
FIG. 6 is a structural diagram of a communications device according to an embodiment of this application.

Optionally, as shown in FIG. 6, an embodiment of this application further provides a communications device 600, including a processor 601, a memory 602, and a program or instructions stored in the memory 602 and capable of running on the processor 601. For example, in a case that the communications device 600 is a terminal, when the program or instructions are executed by the processor 601, the processes of the foregoing embodiment of the resource transmission method in FIG. 2 are implemented, with the same technical effects achieved. In a case that the communications device 600 is a network-side device, when the computer program is executed by the processor 601, the processes of the embodiment of the resource transmission method in FIG. 3 are implemented, with the same technical effects achieved. To avoid repetition, details are not described herein again.

Figure 7:
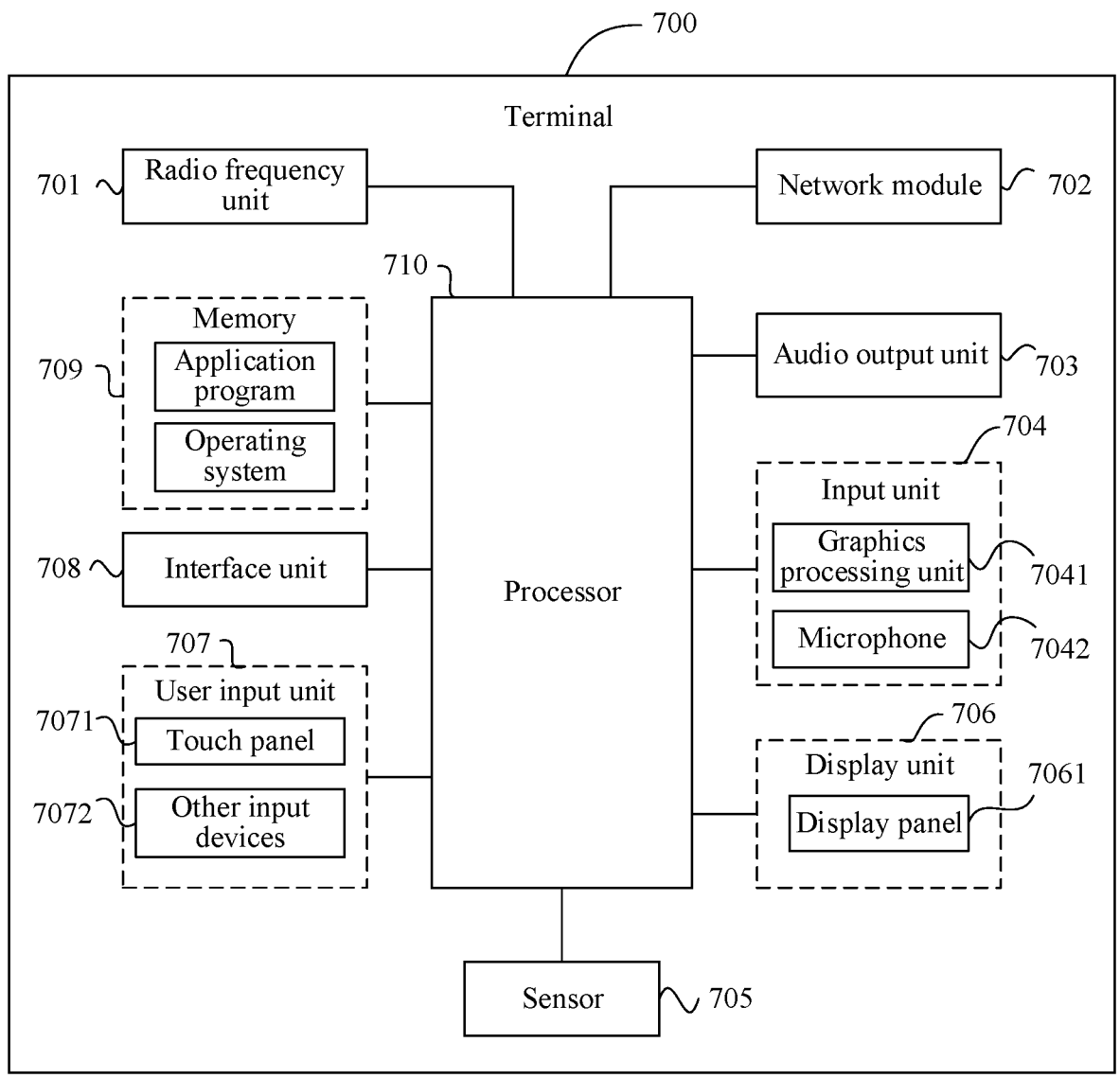
FIG. 7 is a structural diagram of a terminal according to an embodiment of this application.

FIG. 7 is a schematic diagram of a hardware structure of a terminal for implementing the embodiments of this application.

The terminal 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

Those skilled in the art can understand that the terminal 700 may further include a power supply (for example, a battery) that supplies power to various components. The power supply may be logically connected to the processor 710 through a power management system, so that functions such as charge and discharge management and power consumption management are implemented by using the power management system. The terminal is not limited to the terminal structure shown in FIG. 7. The terminal may include more or fewer components than shown in the figure, or combine some of the components, or arrange the components differently. Details are not described herein.

It should be understood that in this embodiment of this application, the input unit 704 may include a graphics processing unit (GPU) 7041 and a microphone 7042. The graphics processing unit 7041 processes image data of a static picture or a video that is obtained by an image capture apparatus (for example, a camera) in a video capture mode or an image capture mode. The display unit 706 may include the display panel 7061. The display panel 7061 may be configured in a form of a liquid crystal display, an organic light-emitting diode, or the like. The user input unit 707 includes a touch panel 7071 and other input devices 7072. The touch panel 7071 is also referred to as a touchscreen. The touch panel 7071 may include two parts: a touch detection apparatus and a touch controller. The other input devices 7072 may include but are not limited to a physical keyboard, a function button (for example, a volume control button or a power button), a trackball, a mouse, and a joystick. Details are not described herein.

In this embodiment of this application, the radio frequency unit 701 sends downlink information received from a network-side device to the processor 710 for processing, and in addition, sends uplink data to the network-side device. Generally, the radio frequency unit 701 includes but is not limited to an antenna, at least one amplifier, a transceiver, a coupler, a low noise amplifier, a duplexer, and the like.

The memory 709 may be configured to store software programs or instructions and various data. The memory 709 may mainly include a program or instruction storage area and a data storage area. The program or instruction storage area may store an operating system, an application program or instructions required by at least one function (for example, an audio play function or an image play function), and the like. In addition, the memory 709 may include a high-speed random access memory, and may further include a non-volatile memory, where the non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or other non-volatile solid-state storage devices.

The processor 710 may include one or more processing units. Optionally, the processor 710 may integrate an application processor and a modem processor. The application processor mainly processes an operating system, a user interface, an application program or instructions, and the like. The modem processor mainly processes wireless communication, and for example, may be a baseband processor. It can be understood that the modem processor may alternatively be not integrated into the processor 710.

The processor 710 is configured to obtain first information, where the first information includes at least one of configuration information and scheduling information for uplink transmission; and determine an uplink transmission mode based on the first information, where the uplink transmission mode supports frequency hopping on an unlicensed frequency band, or the uplink transmission mode does not support frequency hopping on the unlicensed frequency band.

Optionally, the first information satisfies any one of the following:

being configured by a network-side device; and being specified by a protocol.

Optionally, in a case that the scheduling information indicates that the uplink transmission is a configured grant based physical uplink shared channel PUSCH and that a number of candidate PUSCHs in a slot is 1, the uplink transmission mode supports intra-slot frequency hopping on the unlicensed frequency band.

Optionally, in a case that the scheduling information indicates that the uplink transmission is a configured grant based PUSCH, that a number of candidate PUSCHs in a slot is 1, and that a number of consecutive slots is greater than 1, the uplink transmission mode supports intra-slot frequency hopping and/or inter-slot frequency hopping on the unlicensed frequency band.

Optionally, in a case that the scheduling information indicates that the uplink transmission is a dynamic grant based PUSCH, and that a first preset condition is satisfied, the uplink transmission mode supports intra-slot frequency hopping on the unlicensed frequency band.

The first preset condition includes at least one of the following:

the terminal being not configured with a PUSCH aggregation factor;
a number of repetitions of the dynamic grant based PUSCH being 1;
scheduling of one PUSCH being permitted in uplink scheduling; and
scheduling of at least two PUSCHs being permitted in uplink scheduling, and time-domain resources for the at least two PUSCHs scheduled being located in at least one slot.

Optionally, in a case that the scheduling information indicates that the uplink transmission is a dynamic grant based PUSCH and that a second preset condition is satisfied, the uplink transmission mode supports intra-slot frequency hopping and/or inter-slot frequency hopping on the unlicensed frequency band.

The second preset condition includes at least one of the following:

the terminal being configured with a PUSCH aggregation factor;
a number of repetitions of the dynamic grant based PUSCH being greater than 1;
scheduling of one PUSCH being permitted in uplink scheduling; and
scheduling of at least two PUSCHs being permitted in uplink scheduling, and time-domain resources for the at least two PUSCHs scheduled being located in at least one slot.

Optionally, in a case that scheduling of at least two PUSCHs is permitted in uplink scheduling, and that time-domain resources for the at least two PUSCHs scheduled are located in at least one slot, the terminal transmits only PUSCH(s) in a first slot.

Optionally, a frequency hopping pattern of the intra-slot frequency hopping and/or inter-slot frequency hopping is configured by a network-side device.

Optionally, in a case that the uplink transmission mode supports frequency hopping on the unlicensed frequency band, the uplink transmission mode supports at least one of the following frequency hopping patterns:

intra-PUSCH frequency hopping;
intra-slot frequency hopping for at least two PUSCHs;
consecutive inter-PUSCH frequency hopping; and
inter-slot frequency hopping.

Optionally, a time location for frequency hopping is determined based on at least one of the following:

an actual PUSCH transmission location; and
a configured PUSCH candidate transmission location.

Optionally, in the frequency hopping patterns, the terminal transmits same or different PUSCHs in one dynamic scheduling and/or one configured grant period.

It should be noted that the terminal 700 can implement the processes in the foregoing embodiment of the resource transmission method in FIG. 2, with the same technical effects achieved. Details are not described herein again.

In this embodiment of this application, a terminal obtains configuration information and/or scheduling information for uplink transmission in first information, and then determines an uplink transmission mode, where the uplink transmission mode supports frequency hopping on an unlicensed frequency band, or the uplink transmission mode does not support frequency hopping on the unlicensed frequency band. In this way, behaviors of the terminal on the unlicensed frequency band are defined so that two uplink transmission modes, frequency hopping or no frequency hopping, on the unlicensed frequency band can be implemented by the terminal, enhancing flexibility of the terminal in uplink transmission on the unlicensed frequency band.

Figure 8:
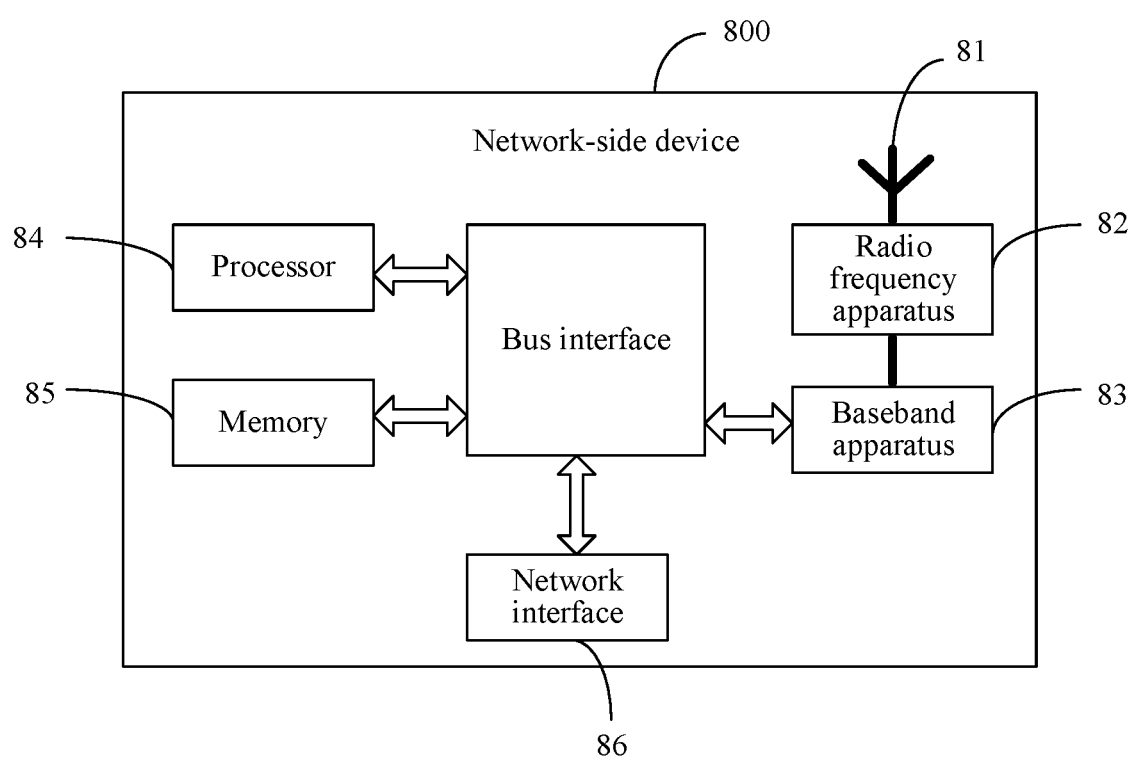
FIG. 8 is a structural diagram of a network-side device according to an embodiment of this application.

Specifically, an embodiment of this application further provides a network-side device. As shown in FIG. 8, the network side device 800 includes an antenna 81, a radio frequency apparatus 82, and a baseband apparatus 83. The antenna 81 is connected to the radio frequency apparatus 82. In an uplink direction, the radio frequency apparatus 82 receives information by using the antenna 81, and transmits the received information to the baseband apparatus 83 for processing. In a downlink direction, the baseband apparatus 83 processes to-be-transmitted information, and transmits the information to the radio frequency apparatus 82; and the radio frequency apparatus 82 processes the received information and then transmits the information by using the antenna 81.

The method performed by the network-side device in the foregoing embodiments may be implemented in the baseband apparatus 83, and the baseband apparatus 83 includes a processor 84 and a memory 85.

The baseband apparatus 83 may include, for example, at least one baseband processing unit, where a plurality of chips are disposed on the baseband processing unit. As shown in FIG. 8, one of the chips is, for example, the processor 84, and connected to the memory 85, to invoke the program in the memory 85 to perform the operations of the network device shown in the foregoing method embodiment.

The baseband apparatus 83 may further include a network interface 86, configured to exchange information with the radio frequency apparatus 82, where the interface is, for example, a common public radio interface (CPRI).

Specifically, the network-side device in this embodiment of the present invention further includes instructions or a program stored in the memory 85 and capable of running on the processor 84. The processor 84 invokes the instructions or program in the memory 85 to perform the method performed by the modules shown in FIG. 5, with the same technical effects achieved. To avoid repetition, details are not described herein again.

An embodiment of this application further provides a readable storage medium, where the readable storage medium stores a program or instructions, and when the program or instructions are executed by a processor, the processes of the foregoing embodiment of the resource transmission method in FIG. 2 are implemented, or the processes of the foregoing embodiment of the resource transmission method in FIG. 3 are implemented, with the same technical effects achieved. To avoid repetition, details are not described herein again.

The processor is the processor of the terminal in the foregoing embodiment. The readable storage medium includes a computer-readable storage medium such as a read-only memory (ROM), a random access memory (RAM), a magnetic disk, an optical disc, or the like.

An embodiment of this application further provides a chip, where the chip includes a processor and a communications interface, the communications interface is coupled to the processor, and the processor is configured to run a program or instructions to implement the processes of the foregoing embodiment of the resource transmission method in FIG. 2, or implement the processes of the foregoing embodiment of the resource transmission method in FIG. 3, with the same technical effects achieved. To avoid repetition, details are not described herein again.

It should be understood that the chip mentioned in this embodiment of this application may also be referred to as a system-on-chip, a system chip, a chip system, or the like.

It should be noted that the terms "comprise", "include", or any of their variants in this specification are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In the absence of more restrictions, an element defined by "including a . . . " does not exclude another same element in a process, method, article, or apparatus that includes the element. In addition, it should be noted that the scope of the methods and apparatuses in the embodiments of this application is not limited to performing functions in the order shown or discussed, but may further include performing functions at substantially the same time or in reverse order depending on the involved functions. For example, the described method may be performed in an order different from the described order, and steps may be added, omitted, or combined. In addition, features described with reference to some examples may be combined in other examples.

By means of the foregoing description of the embodiments, persons skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this application essentially or the part contributing to the prior art may be implemented in a form of a software product. The software product may be stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in each embodiment of this application.

It should be understood that division of the modules is merely logical function division. Some or all of the modules may be integrated in a physical entity or may be separated physically in an actual implementation. These modules may be all implemented in a form of software invoked by a processing component, or may be all implemented in a form of hardware; or some of the modules may be implemented in a form of software invoked by a processing component, and some of the modules may be implemented in a form of hardware. For example, an obtaining module may be a processing component that is separately disposed, or may be integrated in a chip of the apparatus for implementation. In addition, the determining module may be stored in the memory of the apparatus in a form of program code, and is invoked by a processing component of the apparatus to perform a function of the obtaining module. Implementation of other modules is similar to this. In addition, all or some of the modules may be integrated, or may be implemented independently. Herein, the processing component may be an integrated circuit, and has a signal processing capability. In an implementation process, the steps in the foregoing method or the foregoing modules may be implemented by using an integrated logic circuit of hardware of the processor component or by using instructions in a form of software.

For example, the modules, units, subunits or submodules may be one or more integrated circuits configured to implement the foregoing method, for example, one or more application specific integrated circuits (ASIC), or one or more microprocessors (digital signal processor, DSP), or one or more field programmable gate arrays (FPGA). For another example, when one of the foregoing modules is implemented in a form of program code invoked by a processing component, the processing component may be a general-purpose processor, for example, a central processing unit (CPU) or another processor that may invoke program code. For another example, the modules may be integrated in a form of a system-on-a-chip (SOC) for implementation.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners shall fall within the protection scope of this application.

What is claimed is:

1. A resource transmission method, applied to a terminal and comprising:
   obtaining first information, wherein the first information comprises at least one of configuration information and scheduling information for uplink transmission; and
   determining an uplink transmission mode based on the first information, wherein the uplink transmission mode supports frequency hopping on an unlicensed frequency band,
   wherein in a case that the scheduling information indicates that the uplink transmission is a dynamic grant based PUSCH, and that a first preset condition is satisfied, the uplink transmission mode supports intra-slot frequency hopping on the unlicensed frequency band, and
   wherein the first preset condition comprises at least one of the following: the terminal being not configured with a PUSCH aggregation factor; and scheduling of at least two PUSCHs being permitted in uplink scheduling, and time-domain resources for the at least two PUSCHs scheduled being located in at least one slot.

2. The method according to claim 1, wherein the first information satisfies any one of the following: being configured by a network-side device; and being specified by a protocol.

3. The method according to claim 1, wherein in a case that the scheduling information indicates that the uplink transmission is a configured grant based physical uplink shared channel PUSCH and that a number of candidate PUSCHs in a slot is 1, the uplink transmission mode supports intra-slot frequency hopping on the unlicensed frequency band.

4. The method according to claim 1, wherein in a case that the scheduling information indicates that the uplink transmission is a configured grant based PUSCH, that a number of candidate PUSCHs in a slot is 1, and that a number of consecutive slots is greater than 1, the uplink transmission mode supports intra-slot frequency hopping and/or inter-slot frequency hopping on the unlicensed frequency band.

5. The method according to claim 1, wherein
the first preset condition further comprises at least one of the following:
a number of repetitions of the dynamic grant based PUSCH being 1; and
scheduling of one PUSCH being permitted in uplink scheduling.

6. The method according to claim 1, wherein in a case that the scheduling information indicates that the uplink transmission is a dynamic grant based PUSCH and that a second preset condition is satisfied, the uplink transmission mode supports intra-slot frequency hopping and/or inter-slot frequency hopping on the unlicensed frequency band, wherein
the second preset condition comprises at least one of the following:
the terminal being configured with a PUSCH aggregation factor;
a number of repetitions of the dynamic grant based PUSCH being greater than 1;
scheduling of one PUSCH being permitted in uplink scheduling; and
scheduling of at least two PUSCHs being permitted in uplink scheduling, and time-domain resources for the at least two PUSCHs scheduled being located in at least one slot;
wherein in a case that scheduling of at least two PUSCHs is permitted in uplink scheduling, and that time-domain resources for the at least two PUSCHs scheduled are located in at least one slot, the terminal transmits only PUSCH(s) in a first slot.

7. The method according to claim 1, wherein in a case that the uplink transmission mode supports frequency hopping on the unlicensed frequency band, the uplink transmission mode supports intra-PUSCH frequency hopping.

8. The method according to claim 7, wherein the uplink transmission mode further supports at least one of the following frequency hopping patterns:
intra-slot frequency hopping for at least two PUSCHs;
consecutive inter-PUSCH frequency hopping; and
inter-slot frequency hopping.

9. The method according to claim 7, wherein in the frequency hopping patterns, the terminal transmits same or different PUSCHs in one dynamic scheduling.

10. A resource transmission method, applied to a network-side device and comprising:
transmitting first information to a terminal; wherein
the first information comprises at least one of configuration information and scheduling information for uplink transmission, the first information is used to indicate an uplink transmission mode for the terminal, and the uplink transmission mode supports frequency hopping on an unlicensed frequency band,
wherein in a case that the scheduling information indicates that the uplink transmission is a dynamic grant based PUSCH, and that a first preset condition is satisfied, the uplink transmission mode supports intra-slot frequency hopping on the unlicensed frequency band, and
wherein the first preset condition comprises at least one of the following: the terminal being not configured with a PUSCH aggregation factor; and scheduling of at least two PUSCHs being permitted in uplink scheduling, and time-domain resources for the at least two PUSCHs scheduled being located in at least one slot.

11. The method according to claim 10, wherein in a case that the scheduling information indicates that the uplink transmission is a configured grant based physical uplink shared channel PUSCH and that a number of candidate PUSCHs in a slot is 1, the uplink transmission mode supports intra-slot frequency hopping on the unlicensed frequency band.

12. The method according to claim 10, wherein in a case that the scheduling information indicates that the uplink transmission is a configured grant based PUSCH, that a number of candidate PUSCHs in a slot is 1, and that a number of consecutive slots is greater than 1, the uplink transmission mode supports intra-slot frequency hopping and/or inter-slot frequency hopping on the unlicensed frequency band.

13. The method according to claim 10, wherein
the first preset condition further comprises at least one of the following:
a number of repetitions of the dynamic grant based PUSCH being 1; and
scheduling of one PUSCH being permitted in uplink scheduling.

14. The method according to claim 10, wherein in a case that the scheduling information indicates that the uplink transmission is a dynamic grant based PUSCH and that a second preset condition is satisfied, the uplink transmission mode supports intra-slot frequency hopping and/or inter-slot frequency hopping on the unlicensed frequency band, wherein
the second preset condition comprises at least one of the following:
the terminal being configured with a PUSCH aggregation factor;
a number of repetitions of the dynamic grant based PUSCH being greater than 1;
scheduling of one PUSCH being permitted in uplink scheduling; and
scheduling of at least two PUSCHs being permitted in uplink scheduling, and time-domain resources for the at least two PUSCHs scheduled being located in at least one slot.

15. The method according to claim 14, wherein in a case that scheduling of at least two PUSCHs is permitted in uplink scheduling, and that time-domain resources for the at least two PUSCHs scheduled are located in at least one slot, the first information is used to indicate that the terminal transmits only PUSCH(s) in a first slot.

16. The method according to claim 10, wherein in a case that the uplink transmission mode supports frequency hopping on the unlicensed frequency band, the uplink transmission mode supports intra-PUSCH frequency hopping.

17. The method according to claim 16, wherein the uplink transmission mode further supports at least one of the following frequency hopping patterns:
intra-slot frequency hopping for at least two PUSCHs;
consecutive inter-PUSCH frequency hopping; and
inter-slot frequency hopping.

18. The method according to claim 16, wherein in the frequency hopping patterns, the terminal transmits same or different PUSCHs in one dynamic scheduling.

19. A communications device, comprising:
at least one hardware processor, a memory, and a program or instructions stored in the memory and capable of running on the at least one hardware processor, wherein when the program or instructions are executed by the at least one hardware processor, the at least one hardware processor is directed to perform:
obtaining first information, wherein the first information comprises at least one of configuration information and scheduling information for uplink transmission; and determining an uplink transmission mode based on the first information, wherein the uplink transmission mode supports frequency hopping on an unlicensed frequency band, wherein in a case that the scheduling information indicates that the uplink transmission is a dynamic grant based PUSCH, and that a first preset condition is satisfied, the uplink transmission mode supports intra-slot frequency hopping on the unlicensed frequency band, and wherein the first preset condition comprises at least one of the following: the terminal being not configured with a PUSCH aggregation factor; and scheduling of at least two PUSCHs being permitted in uplink scheduling, and time-domain resources for the at least two PUSCHs scheduled being located in at least one slot.

20. A communications device, comprising at least one hardware processor, a memory, and a program or instructions stored in the memory and capable of running on the at least one hardware processor, wherein when the program or instructions are executed by the at least one hardware processor, the resource transmission method according to claim 10 is implemented.

* * * * *